UNITED STATES PATENT OFFICE.

CORNELIUS D. VREELAND, OF UPPER MONTCLAIR, NEW JERSEY.

INSECTICIDE.

1,184,665. Specification of Letters Patent. Patented May 23, 1916.

No Drawing. Application filed April 3, 1915. Serial No. 18,999.

*To all whom it may concern:*

Be it known that I, CORNELIUS D. VREELAND, a citizen of the United States, residing at Upper Montclair, in the county of Essex and State of New Jersey, have invented certain new and useful Improvements in Insecticides, of which the following is a specification.

The active agent in the commonly used insecticides is arsenic in one form or another. This element has excellent insecticidal properties, but it is known that it is also very injurious to vegetation, more especially in the presence of moisture. Heretofore it has been impossible to employ arsenic in such a form that while it would have an adequate insecticidal range it would not also be injurious to the foliage of trees and plants: to avoid injury to vegetation, the practice has heretofore been to employ a compound weak in arsenic, which of course meant relatively low insecticidal power and a consequently restricted insecticidal range so far as the common kinds of tree- and plant-eating insects are concerned.

The principal object of this invention is to produce an insecticide which shall have ample insecticidal properties and at the same time have little or no effect to injure vegetation with which it comes into contact. This I accomplish by enveloping or incasing each arsenic-bearing particle of the improved insecticide within a coating which is decomposable in the digestive systems of insects but is calculated to isolate the arsenical substance more or less perfectly from actual contact with the foliage or other part of a tree or plant upon which the insecticide is deposited. In the preferred form of the invention, the said coating and the arsenical substance are of such character that when a solute, such as moisture, acts upon the latter, as in a case where the coating perchance imperfectly envelops said substance, such a reaction shall take place as will produce a compound more innocuous so far as plant life is concerned than the arsenical substance itself is or than it would even be in the presence of a solute.

I now proceed to a detailed description of my invention, having reference to the preferred manner of producing the improved insecticide. The insecticidal agent which I employ in the preferred practice of my invention is arsenite of zinc—a substance which is easily broken up in the bodies of leaf-eating insects by their digestive fluids and has a high arsenic content, being therefore a very effective destroyer of a considerable variety of insects. A suitable quantity of this substance (it may be in pulp form, in which case the actual amount of zinc arsenite on the dry basis is known) is mixed with water in such quantity that there shall be about one part of actual zinc arsenite to sixteen parts of water. Into this mixture is introduced a solution of basic sulfate of iron, or ferric sulfate, of such strength that the ferric oxid of the hydroxid to be produced shall equal about one to two per cent. of the weight of the resulting solids on the dry basis, and thoroughly mix these ingredients together. When the zinc arsenite, water and basic ferric sulfate have been thoroughly mixed a dilute solution of an alkali, preferably caustic soda of known strength sufficient to precipitate the basic ferric sulfate, is carefully run into the mixture. This causes ferric hydroxid to be deposited in colloidal form in and around the particles of zinc arsenite. The resultant precipitate is then allowed to settle, and may be filtered and used in paste form or, which is preferable, it may be dried and reduced to and used in the form of a powder. In the insecticide resulting from this procedure each arsenite particle is more or less perfectly enveloped by a protecting coating which isolates the arsenic thereof from contact with the foliage of trees or plants on which the insecticide may repose and which is nevertheless decomposable in the digestive systems of insects; there is the further property that in the presence of a solute the consequent solution of zinc arsenite will give up its arsenious acid, which will unite with the basic hydroxid of the coating or envelop at once to form a less readily decomposable arsenite than zinc arsenite, thus increasing the element of safety so far as vegetation is concerned.

Having thus fully described my invention, what I claim as new and desire to secure by Letters Patent is:—

1. The hereindescribed insecticide in the form of distinct minute particles each including an arsenical body and an envelop coating said body and composed of a substance less harmful to vegetation than the arsenical body.

2. The hereindescribed insecticide in the form of distinct minute particles each including an arsenical body and an envelop coating said body and composed of a substance insoluble in water and less harmful to vegetation than the arsenical body.

3. The hereindescribed insecticide in the form of distinct minute particles each including an arsenical body and an envelop coating said body and composed of a substance less harmful to vegetation than the arsenical body and precipitated on said body.

4. The hereindescribed insecticide consisting of distinct particles of an arsenical substance each enveloped in an oxid less harmful to vegetation than the arsenical substance.

5. The hereindescribed insecticide consisting of distinct particles of an arsenical substance each enveloped in a ferric oxid less harmful to vegetation than the arsenical substance.

6. The hereindescribed insecticidal powder in the form of distinct minute particles each including an arsenical body and an envelop coating said body and composed of a substance less harmful to vegetation than the arsenical body.

7. The hereindescribed insecticide consisting of particles of an arsenical substance enveloped in a substance adapted in the presence of a solute of the arsenical substance to form with such arsenical substance a compound less harmful to vegetation than the dissolved arsenical substance.

8. The hereindescribed insecticide consisting of particles of an arsenical substance coated with an oxid adapted in the presence of a solute of the arsenical substance to form with such arsenical substance a compound less harmful to vegetation than the dissolved arsenical substance.

In testimony whereof I affix my signature.

CORNELIUS D. VREELAND.